US006979366B2

(12) United States Patent
Chatterji et al.

(10) Patent No.: US 6,979,366 B2
(45) Date of Patent: Dec. 27, 2005

(54) METHODS OF CEMENTING PIPE IN WELL BORES AND LOW DENSITY CEMENT COMPOSITIONS THEREFOR

(75) Inventors: Jiten Chatterji, Duncan, OK (US); Roger S. Cromwell, Walters, OK (US); Darrel C. Brenneis, Marlow, OK (US); Bobby J. King, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 417 days.

(21) Appl. No.: 10/315,835

(22) Filed: Dec. 10, 2002

(65) Prior Publication Data

US 2004/0016371 A1 Jan. 29, 2004

Related U.S. Application Data

(62) Division of application No. 10/205,085, filed on Jul. 25, 2002, now Pat. No. 6,516,883.

(51) Int. Cl.[7] .............................................. C04B 14/22

(52) U.S. Cl. ...................... 106/676; 106/677; 106/678; 106/724

(58) Field of Search ................................ 106/724, 676, 106/677, 678

(56) References Cited

U.S. PATENT DOCUMENTS

| | | | | |
|---|---|---|---|---|
| 3,042,535 A * | 7/1962 | Hiltrop et al. | | |
| 3,804,058 A * | 4/1974 | Messenger | 166/293 |
| 4,252,193 A | 2/1981 | Powers et al. | 166/295 |
| 4,304,298 A | 12/1981 | Sutton | 166/293 |
| 4,340,427 A | 7/1982 | Sutton | 106/87 |
| 4,362,566 A * | 12/1982 | Hinterwaldner | |
| 4,370,166 A | 1/1983 | Powers et al. | 106/676 |
| 4,391,646 A * | 7/1983 | Howell | 501/33 |
| 4,530,402 A | 7/1985 | Smith et al. | 166/291 |
| 5,621,043 A | 4/1997 | Croft | 525/111 |
| 5,897,699 A | 4/1999 | Chatterji et al. | 106/678 |
| 6,063,738 A | 5/2000 | Chatterji et al. | 507/269 |
| 6,152,227 A | 11/2000 | Lawson et al. | 166/293 |
| 6,196,316 B1 | 3/2001 | Bosma et al. | 166/294 |
| 6,210,476 B1 | 4/2001 | Chatterji et al. | 106/677 |
| 6,279,652 B1 | 8/2001 | Chatterji et al. | 166/194 |
| 6,367,549 B1 | 4/2002 | Chatterji et al. | 166/295 |
| 6,516,883 B1 * | 2/2003 | Chatterji et al. | 166/293 |
| 6,824,607 B2 * | 11/2004 | Baeuml et al. | 106/802 |

FOREIGN PATENT DOCUMENTS

| | | | |
|---|---|---|---|
| SU | 1650625 A * | 5/1991 | C04B 7/00 |
| WO | WO 2001090022 * | 11/2001 | |

OTHER PUBLICATIONS

Halliburton brochure entitled "Spherelite Cement Additive" dated 1999.
3M Scotchlite™ Glass Bubbles brochure dated 1999.
3M Microspheres brochure dated Sep. 2000.
Specialty Materials For the Oil & Gas Industry brochure dated Jun. 2001.

* cited by examiner

*Primary Examiner*—Paul Marcantoni
(74) *Attorney, Agent, or Firm*—Craig W. Roddy; McAfee & Taft, P.C.

(57) ABSTRACT

The present invention provides methods of cementing pipe in well bores and low density cement compositions having enhanced compressive, tensile and bond strengths upon setting. The composition of the invention are basically comprised of a hydraulic cement, sufficient water to form a slurry and hollow glass microspheres surface treated with a mixture of organosilane coupling agents present in an amount sufficient to produce a cement composition density in the range of from about 6 to about 12 pounds per gallon.

21 Claims, No Drawings

METHODS OF CEMENTING PIPE IN WELL BORES AND LOW DENSITY CEMENT COMPOSITIONS THEREFOR

CROSS-REFERENCE TO RELATED APPLICATION

This application is a divisional of application Ser. No. 10/205,085, filed Jul. 25, 2002, now U.S. Pat. No. 6,516,883.

BACKGROUND OF THE INVENTION

1. Field of the Invention

The present invention relates to methods and low density compositions for cementing pipe in well bores, and more particularly, to such methods and compositions for cementing pipe in well bores penetrating subterranean zones or formations which readily fracture at low hydrostatic pressures.

2. Description of the Prior Art

Hydraulic cement compositions are commonly utilized in oil, gas and water well completion and remedial operations. For example, hydraulic cement compositions are used in primary cementing operations whereby strings of pipe such as casing are cemented in well bores. In performing primary cementing, a hydraulic cement composition is pumped into the annular space between the walls of a well bore and the exterior of pipe disposed therein. The cement composition is permitted to set in the annular space thereby forming an annular sheath of hardened substantially impermeable cement therein. The cement sheath physically supports and positions the pipe in the well bore and bonds the pipe to the walls of the well bore whereby the undesirable migration of fluids between zones or formations penetrated by the well bore is prevented.

In some locations, the subterranean zones or formations into or through which wells are drilled have high permeabilities and low compressive and tensile strengths. As a result, the resistances of the zones or formations to shear are low and they have very low fracture gradients. When a well fluid such as a hydraulic cement composition is introduced into a well bore penetrating such a subterranean zone or formation, the hydrostatic pressure exerted on the walls of the well bore can exceed the fracture gradient of the zone or formation and cause fractures to be formed in the zone or formation into which the cement composition is lost.

While lightweight cement compositions have been developed and used heretofore, i.e., cement compositions having densities as low as about 12 pounds per gallon, subterranean zones or formations are still encountered which have fracture gradients too low for even the lightweight cement compositions to be utilized without fracturing the formation and the occurrence of lost circulation problems. Also, the lightweight cement compositions utilized heretofore have often not had sufficient compressive, tensile and bond strengths upon setting.

Thus, there are continuing needs for improved methods of cementing pipe in well bores and low density cement compositions which have enhanced compressive, tensile and bond strengths upon setting.

SUMMARY OF THE INVENTION

The present invention provides methods of cementing pipe in well bores and low density cement compositions therefor which meet the needs described above and overcome the deficiencies of the prior art. The methods of this invention for cementing pipe in well bores penetrating subterranean zones or formations which readily fracture at low hydrostatic pressures are comprised of the following steps. A low density cement composition having enhanced compressive, tensile and bond strengths upon setting is provided comprised of a hydraulic cement, sufficient water to form a slurry and hollow glass microspheres which are surface treated with a mixture of organosilane coupling agents present in an amount sufficient to produce a cement composition density in the range of from about 6 to about 12 pounds per gallon. The cement composition is placed into the annulus between the pipe to be cemented and the walls of the well bore and the cement composition is allowed to set therein. Upon setting, the cement composition provides enhanced compressive, tensile and bond strengths and seals the exterior surface of the pipe to the walls of the well bore.

A low density cement composition having enhanced compressive, tensile and bond strengths upon setting of this invention is comprised of a hydraulic cement, sufficient water to form a slurry and hollow glass micro spheres surface treated with a mixture of organosilane coupling agents present in an amount sufficient to produce a cement composition density in the range of from about 6 to about 12 pounds per gallon.

The low density cement compositions of this invention described above can also have densities of about 5 pounds per gallon or below by foaming the compositions.

The objects, features and advantages of the present invention will be readily apparent to those skilled in the art upon a reading of the description of preferred embodiments which follows.

DESCRIPTION OF PREFERRED EMBODIMENTS

Improved methods of cementing pipe in well bores penetrating subterranean zones or formations which readily fracture at low hydrostatic pressures are provided by the present invention. The methods are basically comprised of the following steps. A low density cement composition having enhanced compressive, tensile and bond strengths upon setting is provided. The low density cement composition is comprised of a hydraulic cement, sufficient water to form a slurry, hollow glass microspheres which have been surface treated with a mixture of organosilane coupling agents and optionally, a gas and a mixture of foaming and foam stabilizing surfactants for foaming the cement composition. The microspheres are present in the low density cement composition in an amount sufficient to produce a density in the range of from about 6 to about 12 pounds per gallon and when the composition is foamed, it can have a density of about 5 or below. The cement composition is placed into the annulus between the pipe and the walls of the well bore and the cement composition is allowed to set therein.

Because the cement composition has a low density, i.e., a density such that the hydrostatic pressure of the cement composition exerted in the subterranean zone or formation being cemented is less than the fracture gradient of the subterranean zone or formation, fracturing of the zone or formation does not take place. Also, because the cement composition of this invention has enhanced compressive, tensile and bond strengths upon setting, a strong bond exists between the pipe and the walls of the well bore penetrating the subterranean zone or formation which prevents formation fluids from entering the annulus between the pipe and the well bore. The high overall strength of the cement composition also prevents it from being shattered by contact with the drill bit and drill string when the well is drilled to greater depths.

Examples of hydraulic cements which can be utilized in accordance with the present invention include, but are not limited to, Portland cements, slag cements, pozzolana cements, gypsum cements, aluminous cements, silica cements and alkaline cements. Of these, Portland cement is preferred. The Portland cement can be of ultra fine particle size or standard particle size with the ultra fine particle size being preferred for use in subterranean zones or formations having high permeabilities and which fracture at very low cement hydrostatic pressures.

The water utilized in the cement composition can be fresh water or salt water. The term "salt water" is used herein to mean unsaturated salt solutions or saturated salt solutions including brine and seawater. The water used is generally present in the low density cement composition in an amount in the range of from about 58% to about 160% by weight of the hydraulic cement in the composition.

The hollow glass microspheres utilized in the low density cement compositions are preferably synthetic hollow glass microspheres which are commercially available from the Minnesota, Mining and Manufacturing Co. ("3M™") under the trade name "SCOTCHLITE™". These very low density microspheres are formed of a chemically stable soda-lime borosilicate glass composition which is non-porous. The hollow glass microspheres are included in the cement composition of this invention in an amount sufficient to produce a cement composition density in the range of from about 5 to about 12 pounds per gallon. Generally, the hollow glass microspheres are included in the cement composition in an amount of from about 10% to about 21% by weight of hydraulic cement in the composition.

The surfaces of the hollow glass microspheres utilized in the cement compositions of this invention are pretreated with a mixture of epoxy and amine organosilane coupling agents. The organosilane coupling agents greatly improve the wetability of the hollow glass microspheres whereby they can readily be mixed with the aqueous cement composition. In addition, the organosilane coupling agents attach to the surfaces of the hollow glass microspheres and form silanol thereon. The silanol undergoes immediate dehydration resulting in-silicon-oxygen-silicon-bonds (—Si—O—Si—) between the cement utilized and the hollow glass microspheres thereby enhancing the compressive, tensile and bond strengths of the cement composition upon setting.

While various organosilane coupling agents can be utilized, the coupling agents are preferably selected from a mixture of epoxy and amine organosilane coupling agents. Examples of such mixtures include 3-glycidoxypropyltrimethoxy silane and 3-aminopropyltriethoxy silane or 3-glycidoxypropyltrimethoxy silane and N-2-(aminoethyl)-3-aminopropyltrimethoxy silane. Most preferably, the organosilane coupling agent mixture used to surface treat the hollow glass microspheres is a 1:1 by weight mixture of 3-glycidoxypropyltrimethoxy silane and 3-aminopropyltriethoxy silane.

The surface treatment of the hollow glass microspheres is carried out by combining the mixture of organosilanes utilized with ethyl acetate while stirring the ethyl acetate. Thereafter, the hollow glass microspheres are added to the ethyl acetate and organosilane mixture therein. The resulting mixture is heated at 170° F. for about 1 hour with continuous stirring, followed by filtration and drying. Thereafter, the surface treated hollow glass microspheres are heated to 150° F. in a vacuum oven for 24 hours. Under these conditions, the amino group of the amino organosilane reacts with the epoxy group of the epoxy organosilane on the surfaces of the hollow glass microspheres.

The surface treated hollow glass microspheres are included in the low density cement compositions in an amount in the range of from about 10% to about 21% by weight of the hydraulic cement therein to thereby produce cement composition densities in the range of from about 6 to about 12.

In order to produce a cement composition of this invention having a density below about 6 pounds per gallon, i.e., a density of about 5 pounds per gallon or below, the cement composition is foamed. That is, a gas is added to the cement composition along with a mixture of foaming and foam stabilizing surfactants which facilitate the formation of the foam and stabilize the foamed composition.

The gas utilized for foaming the cement composition can be air or nitrogen, with nitrogen being preferred. A cement composition having surface treated hollow glass microspheres therein and having a density of about 6 pounds per gallon is foamed with the gas to produce a density of about 5 pounds per gallon or below. The gas is generally present in the cement composition in an amount in the range of from about 20% to about 80% by volume of the cement composition, preferably from about 20% to about 50%. Prior to foaming the cement composition with the gas as described above, the mixture of foaming and foam stabilizing surfactants is combined with the cement composition in an amount sufficient to facilitate the formation of the foam and stabilize the resulting foamed composition.

A variety of foaming and foam stabilizing surfactants can be utilized in accordance with the present invention. A preferred mixture of such surfactants is described in U.S. Pat. No. 5,897,699 issued to Chatterji et al. on Apr. 27, 1999 which is incorporated herein by reference thereto. The surfactant mixture is basically comprised of an aqueous solution of an alpha-olefinic sulfonate and a cocoylamidopropyl betaine.

A more preferred mixture of foaming and foam stabilizing surfactants for use in accordance with this invention is described in U.S. Pat. No. 6,063,738 issued to Chatterji et al.

on May 16, 2000 which is incorporated herein by reference thereto. The surfactant mixture is comprised of an ethoxylated alcohol ether sulfate of the formula $H(CH_2)_a(OC_2H_4)_bOSO_3NH_4^+$ wherein a is an integer in the range of from about 6 to about 10 and b is an integer in the range of from about 3 to about 10; an alkyl or alkene amidopropyl betaine having the formula R—$CONHCH_2CH_2CH_2N^+(CH_3)_2CH_2CO_2^-$ wherein R is a radical selected from the group of decyl, cocoyl, lauryl, cetyl and oleyl; and an alkyl or alkene amidopropyl dimethyl amine oxide having the formula R—$CONHCH_2CH_2CH_2N^+(CH_3)_2O^-$ wherein R is a radical selected from the group of decyl, cocoyl, lauryl, cetyl and oleyl.

The ethoxylated alcohol ether sulfate is generally present in the above described mixture in an amount in the range of from about 60 to 64 parts by weight. The alkyl or alkene amidopropyl betaine is generally present in the mixture in an amount in the range of from about 30 to about 33 parts by weight and the alkyl or alkene amidopropyl dimethyl amine oxide is generally present in the mixture in an amount in the range of from about 3 to about 10 parts by weight.

In order to make the surfactant mixture more easily combinable with the cement composition including the surface treated hollow glass microspheres, water is preferably combined with the surfactant mixture in an amount sufficient to dissolve the surfactants.

A particularly preferred mixture of foaming and foam stabilizing surfactants as described above for use in accordance with the present invention is comprised of ethoxylated alcohol ether sulfate wherein a in the formula thereof set forth above is an integer in the range of from 6 to 10 and the ethoxylated alkyl ether sulfate is present in the mixture in an amount of about 63.3 parts by weight; the alkyl or alkene amidopropyl betaine is cocoylamidopropyl betaine and is present in the mixture in an amount of about 31.7 parts by weight; and the alkyl or alkene amidopropyl dimethylamine oxide is cocoylamidopropyl dimethylamine oxide and is present in the mixture in an amount of about 5 parts by weight.

The mixture of foaming and foam stabilizing surfactants utilized is generally included in the cement composition to be foamed in an amount in the range of from about 0.8% to about 5% by volume of water in the cement composition, preferably in an amount of from about 1% to about 2%.

The low density cement compositions of this invention having enhanced compressive, tensile and bond strengths upon setting include a hydraulic cement, sufficient water to form a slurry and hollow glass microspheres surface treated with a mixture of organosilane coupling agents present in an amount sufficient to produce a cement composition density in the range of from about 6 to about 12 pounds per gallon and optionally, a gas and a mixture of foaming and foam stabilizing surfactants for foaming the cement composition whereby it has a density of about 5 pounds per gallon or below.

The hydraulic cement, water and surface treated hollow glass microspheres as well as the optional gas and surfactants utilized in the cement composition are as described above and are present in the cement composition in the amounts set forth above.

A preferred method of this invention for cementing pipe in a well bore penetrating a subterranean zone or formation which readily fractures at low hydrostatic pressures is comprised of the steps of: (a) providing a low density cement composition having enhanced compressive, tensile and bond strengths upon setting comprised of a hydraulic cement, sufficient water to form a slurry and hollow glass microspheres surface treated with a mixture of organosilane coupling agents present in an amount sufficient to produce a cement composition density in the range of from about 6 to about 12 pounds per gallon; (b) placing the cement composition into the annulus between the pipe and the walls of the well bore; and (c) allowing the cement composition to set therein.

Another preferred method of this invention for cementing pipe in a well bore penetrating a subterranean zone or formation which readily fractures at low hydrostatic pressures is comprised of the steps of: (a) providing a low density cement composition having enhanced compressive, tensile and bond strengths upon setting comprised of a hydraulic cement, sufficient water to form a slurry, hollow glass microspheres surface treated with a mixture of organosilane coupling agents present in an amount sufficient to produce a cement composition density of about 6 pounds per gallon, a gas present in an amount sufficient to foam the cement composition whereby the cement composition has a density of about 5 pounds per gallon or below and a mixture of foaming and foam stabilizing surfactants; (b) placing the cement composition into the annulus between the pipe and the walls of the well bore; and (c) allowing the cement composition to set therein.

A preferred low density cement composition having enhanced compressive, tensile and bond strengths upon setting comprises: a hydraulic cement; sufficient water to form a slurry; and hollow glass microspheres surface treated with a mixture of organosilane coupling agents present in an amount sufficient to produce a cement composition density in the range of from about 6 to about 12 pounds per gallon.

Yet another low density cement composition having enhanced compressive, tensile and bond strengths upon setting comprises: a hydraulic cement; sufficient water to form a slurry; hollow glass microspheres surface treated with a mixture of organosilane coupling agents present in an amount sufficient to produce a cement composition density of about 6 pounds per gallon; a gas present in an amount sufficient to foam the cement composition whereby the cement composition has a density of about 5 pounds per gallon or below; and a mixture of foaming and foam stabilizing surfactants.

In order to further illustrate the methods and compositions of this invention, the following example is given.

EXAMPLE

Two quantities of hollow glass microspheres were obtained from the Minnesota, Mining and Manufacturing Co. having specific gravities of 0.15 and 0.38, respectively. 2,500 milliliters of ethyl acetate were added to each of two 5 liter flasks equipped with stirrers and a mixture comprised of 1.25 grams of 3-glycidoxypropyltrimethoxy silane and 1.25 grams of 3-aminopropyltriethoxy silane were added to the ethyl acetate in each flask. The flasks were continuously stirred while 250 grams of hollow glass microspheres having a specific gravity of 0.15 was added to the ethyl acetate in one flask and 250 grams of hollow glass microspheres having a specific gravity of 0.38 were added to the ethyl acetate in the other flask. The mixtures of ethyl acetate organosilane coupling agent and hollow glass microspheres were heated to 170° F. and held at that temperature for 1 hour while continuously being stirred, followed by filtration and drying. The hollow glass microspheres from each flask were then heated to 150° F. in a vacuum oven for 24 hours. While being heated in the ovens, the organosilane coupling agents reacted with each other on the surface of the hollow glass microspheres. Infrared spectroscopy of the treated hollow glass microspheres showed the appearance of 3 new bands at 1118.89 $cm^{-1}$, 1113.77 $cm^{-1}$ and 1105 $cm^{-1}$ indicating a reaction of the organosilanes with the hollow glass microspheres. Two cement slurries were next prepared by mixing ultrafine Portland cement with fresh water and standard Class G Portland cement with fresh water. To test portions of the ultra fine Portland cement slurry, organosilane surface treated hollow glass microspheres having specific gravities of 0.15 were combined in amounts whereby test cement compositions having densities of 6 pounds per gallon and 7 pounds per gallon were formed. A number of the test cement compositions containing the surface treated hollow glass microspheres and having densities of 6 pounds per gallon were tested as were a number of such cement compositions having densities of 7 pounds per gallon. Also, test compositions having densities of 6 pounds per gallon were foamed with air in the presence of a mixture of foaming and foam stabilizing surfactants. The foamed test cement compositions had densities of 5 pounds per gallon.

In a like manner, a number of test cement compositions containing standard Class G Portland cement were combined with surface treated and non-surface treated hollow glass microspheres. Some of the cement compositions had densities of 10.5 pounds per gallon and others had densities of 12 pounds per gallon. A cement dispersing agent comprised of the condensation product of formaldehyde, acetone and bisulfite was added to same of the test cement compositions in amounts of 1% by weight of cement therein and Class F fly ash was added to other of the test cement compositions in amounts of 50% by weight of cement in the compositions. The test cement compositions and their components and physical properties are shown in Table I below.

TABLE I

Cement Composition Physical Properties

| Cement Composition Sample Number | Density, lb/gal | Cement Type | 3M Microspheres Specific Gravity | 3M Microspheres % By Weight Of Cement | Dispersant, % by wt. of cement | Class F Fly Ash, % by wt. of cement |
|---|---|---|---|---|---|---|
| 1 | 6 | Ultra Fine | 0.15 | 21 | | |
| repeat 1 | 6 | Ultra Fine | 0.15 | 21 | | |
| 2 | 7 | Ultra Fine | 0.15 | 20 | 1.0 | |
| repeat 2 | 7 | Ultra Fine | 0.15 | 20 | 1.0 | |
| 3 | 7 | Ultra Fine | 0.15 | 20 | | 50 |
| repeat 3 | 7 | Ultra Fine | 0.15 | 20 | | 50 |
| 3 foamed | 5 | Ultra Fine | 0.15 | 20 | | 50 |
| repeat 3 foamed | 5 | Ultra Fine | 0.15 | 20 | | 50 |
| 5 | 10.5 | Class G | 0.38 | 20 | | |
| repeat 5 | 10.5 | Class G | 0.38 | 20 | | |
| 6 | 12 | Class G | 0.38 | 10 | | |
| repeat 6 | 12 | Class G | 0.38 | 10 | | |

The test cement composition samples containing organosilane coupling agent surface treated hollow glass microspheres and other test cement composition samples containing untreated hollow glass microspheres were tested for compressive, tensile and bond strengths upon setting. The compressive strengths and tensile strengths of the samples were determined in accordance with the procedures set forth in *API Specification For Materials And Testing For Well Cements*, API Specification 10, 5$^{th}$ Edition, dated Jul. 1, 1990 of the American Petroleum Institute. The samples tested for shear bond strength were placed in the annuluses of pipe assemblies, i.e., small pipes centered inside larger pipes. After setting, the shear bond strength was determined by supporting the larger pipe and applying force to the smaller inner pipe. The shear bond strength was calculated by dividing the total force applied by the broken bonded surface are. The results of these tests are shown in Table II below.

TABLE II

Compressive, Tensile And Bond Strength Test Results

| Cement Composition Sample Number | Treated Microspheres Tensile Strength, psi | Treated Microspheres Compressive Strength, psi | Treated Microspheres Shear Bond, psi | Untreated Microspheres Tensile Strength, psi | Untreated Microspheres Compressive Strength, psi | Untreated Microspheres Shear Bond, psi |
|---|---|---|---|---|---|---|
| 1 | 26.6 | 186 | 28.4 | 23.7 | 115.5 | 21.8 |
| repeat 1 | 32 | 160 | 30 | | | |

TABLE II-continued

| Compressive, Tensile And Bond Strength Test Results | | | | | | |
|---|---|---|---|---|---|---|
| Cement | Treated Microspheres | | | Untreated Microspheres | | |
| Composition Sample Number | Tensile Strength, psi | Compressive Strength, psi | Shear Bond, psi | Tensile Strength, psi | Compressive Strength, psi | Shear Bond, psi |
| 2 | 114.3 | 861 | 96.8 | 80.9 | 849 | 58.8 |
| repeat 2 | 116 | 868 | 104 | | | |
| 3 | 86 | 459 | 500 | 92 | 466 | 122.5 |
| repeat 3 | 94 | 467 | 526 | | | |
| 3 foamed | 91 | 207 | 47.5 | 77.1 | 149.1 | 42.6 |
| repeat 3 foamed | 102 | 211 | 51 | | | |
| 5 | 361 | 3980 | 296 | 315 | 2920 | 158 |
| repeat 5 | 352 | 4020 | 306 | | | |
| 6 | 208 | 2540 | 361 | 191 | 2280 | 296 |
| repeat 6 | 226 | 2890 | 373 | | | |

From Tables I and II, it can be seen that the test cement compositions of this invention containing organosilane coupling agent surface treated hollow glass microspheres had significantly better tensile strengths, compressive strengths and shear bond strengths than did the same cement compositions containing untreated hollow glass microspheres.

Thus, the present invention is well adapted to carry out the objects and attain the ends and advantages mentioned as well as those which are inherent therein. While numerous changes may be made by those skilled in the art, such changes are encompassed within the spirit of this invention as defined by the appended claims.

What is claimed is:

1. A cement composition comprising:

a hydraulic cement;

sufficient water to form a slurry; and hollow glass microspheres surface treated with a mixture of organosilane coupling agents present in an amount sufficient to produce a cement composition density in the range of from about 6 to about 12 pounds per gallon.

2. The composition of claim 1 wherein said hydraulic cement is selected from the group consisting of Portland cements, slag cements, pozzolana cements, gypsum cements, aluminous cements, and silica cements.

3. The composition of claim 1 wherein said hydraulic cement is Portland cement.

4. The composition of claim 1 wherein said water is selected from the group consisting of fresh water and salt water.

5. The composition of claim 1 wherein said water is present in said composition in an amount in the range of from about 58% to about 160% by weight of said hydraulic cement therein.

6. The composition of claim 1 wherein said surface treated hollow glass microspheres are present in said composition in an amount in the range of from about 10% to about 21% by weight of said hydraulic cement therein.

7. The composition of claim 1 wherein said mixture of organosilane coupling agents used to surface treat said hollow glass microspheres is selected from the group consisting of a mixture of 3-glycidoxypropyltrimethoxy silane and 3-aminopropyltriethoxy silane and a mixture of 3-glycidoxypropyltrimethoxy silane and N-2-(aminoethyl)-3-aminopropyltrimethoxy silane.

8. The composition of claim 1 wherein said mixture of organosilane coupling agents used to surface treat said hollow glass microspheres is a 1:1 by weight mixture of 3-glycidoxypropyltrimethoxy silane and 3-aminopropyltriethoxy silane.

9. A cement composition comprising:

a hydraulic cement;

sufficient water to form a slurry;

hollow glass microspheres surface treated with a mixture of organosilane coupling agents present in an amount sufficient to produce a cement composition density in the range of from about 6 to about 12 pounds per gallon;

a gas present in an amount sufficient to form said cement composition; and a mixture of foaming and foam stabilizing surfactants.

10. The composition of claim 9 wherein said hydraulic cement is selected from the group consisting of Portland cements, slag cements, pozzolana cements, gypsum cements, aluminous cements, and silica cements.

11. The composition of claim 9 wherein said hydraulic cement is Portland cement.

12. The composition of claim 9 wherein said water is selected from the group consisting of fresh water and salt water.

13. The composition of claim 9 wherein said water is present in said composition in an amount in the range of from about 58% to about 160% by weight of said hydraulic cement therein.

14. The composition of claim 9 wherein said cement composition has a density of about 5 pounds per gallon or below.

15. The composition of claim 9 wherein said surface treated hollow glass microspheres are present in said composition in an amount in the range of from about 10% to about 21% by weight of said hydraulic cement therein.

16. The composition of claim 9 wherein said mixture of organosilane coupling agents used to surface treat said hollow glass microspheres is selected from the group consisting of a mixture of 3-glycidoxypropyltrimethoxy silane and 3-aminopropyltriethoxy silane and a mixture of 3-glycidoxypropyltrimethoxy silane and N-2-(aminoethyl)-3-aminopropyltrimethoxy silane.

17. The composition of claim 9 wherein said mixture of organosilane coupling agents used to surface treat said hollow glass microspheres is a 1:1 by weight mixture of 3-glycidoxypropyltrimethoxy silane and 3-aminopropyltriethoxy silane.

18. The composition of claim 9 wherein said gas is selected from the group consisting of air and nitrogen.

19. The composition of claim 9 wherein said gas is present in said cement composition in an amount in the range of from about 20% to about 80% by volume of said cement composition.

20. The composition of claim 9 wherein said mixture of foaming and foam stabilizing surfactants in said cement composition is comprised of an ethoxylated alcohol ether sulfate present in said mixture in an amount of about 63.3 parts by weight of said mixture, cocoylamidopropyl betaine present in an amount of about 31.7 parts by weight of said mixture and cocoylamidopropyl dimethylamine oxide present in an amount of about 5 parts by weight of said mixture.

21. The composition of claim 9 wherein said mixture of foaming and foam stabilizing surfactants is present in said cement composition in an amount in the range of from about 0.8% to about 5% by volume of said water therein.

* * * * *